United States Patent [19]
Dietle

[11] Patent Number: 6,109,618
[45] Date of Patent: Aug. 29, 2000

[54] ROTARY SEAL WITH ENHANCED LUBRICATION AND CONTAMINANT FLUSHING

[75] Inventor: Lannie L. Dietle, Sugar Land, Tex.

[73] Assignee: KALSI Engineering, Inc., Sugar Land, Tex.

[21] Appl. No.: 09/073,410

[22] Filed: May 6, 1998

Related U.S. Application Data

[60] Provisional application No. 60/045,791, May 7, 1997.

[51] Int. Cl.$^7$ ........................................... F16J 15/32
[52] U.S. Cl. ............................. 277/559; 277/563
[58] Field of Search ...................... 277/559, 549, 277/550, 560, 563, 574, 552, 301, 427

[56] References Cited

U.S. PATENT DOCUMENTS

| | | | |
|---|---|---|---|
| 4,610,319 | 9/1986 | Kalsi | 175/371 |
| 5,002,289 | 3/1991 | Yasui et al. | 277/559 X |
| 5,230,520 | 7/1993 | Dietle et al. | 277/544 |
| 5,511,886 | 4/1996 | Sink | 384/486 |
| 5,678,829 | 10/1997 | Kalsi et al. | 277/559 X |
| 5,711,534 | 1/1998 | Bengoa et al. | 277/559 X |
| 5,738,358 | 4/1998 | Kalsi et al. | 277/544 |

FOREIGN PATENT DOCUMENTS

| | | | |
|---|---|---|---|
| 1505534 | 3/1978 | United Kingdom | 277/559 X |

*Primary Examiner*—Anthony Knight
*Assistant Examiner*—Alison K. Pickard
*Attorney, Agent, or Firm*—James L. Jackson; Mayor, Day, Caldwell & Keeton, L.L.P.

[57] ABSTRACT

A resilient, ring shaped interference-type hydrodynamic rotary seal having waves on the lubricant side which provide increased film thickness and flushing action by creating contact pressure induced angulated restrictions formed by abrupt restrictive diverters. The angulated restrictions are defined by projecting ridges, corners at the trailing edge of the waves, or simply by use of a converging shape at the trailing edge of the waves which is more abrupt than the gently converging hydrodynamic inlet shape at the leading edge of the waves. The abrupt restrictive diverter performs two functions; a restricting function and a diverting function.

The angulated restrictions cause a local film thickness restriction which produces a damming effect preventing a portion of the lubricant from leaking out of the dynamic sealing interface at the trailing edge of the wave, and results in a much thicker lubricant film thickness under the waves. This contributes to more film thickness in the remainder of the dynamic sealing interface toward the environment because film thickness tends to decay gradually rather than abruptly due to the relative stiffness of the seal material. Because of the angle of the abrupt restrictive diverter relative to the relative rotation direction, in conjunction with the restriction or damming effect, a strong diverting action is produced which pumps lubricant across the dynamic sealing interface toward the environment. The lubricant diversion is caused by the component of the rotational velocity tangent to the abrupt restrictive diverter. The component of rotational velocity normal to the abrupt restrictive diverter causes a portion of the lubricant film to be pumped past the abrupt restrictive diverter, thereby assuring adequate lubrication thereof.

36 Claims, 11 Drawing Sheets

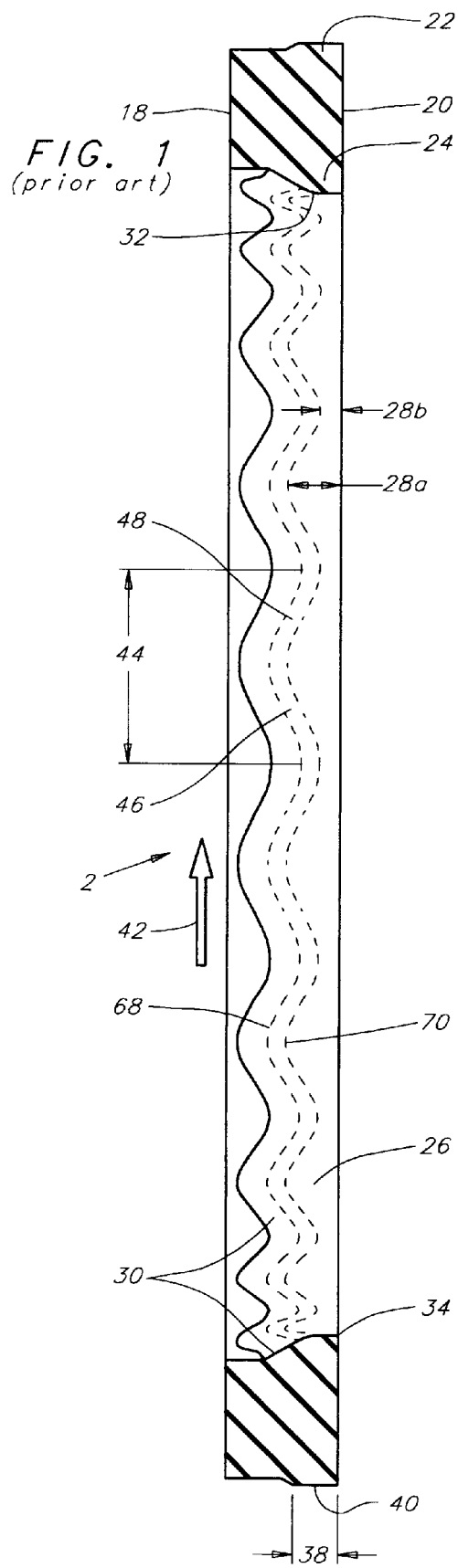

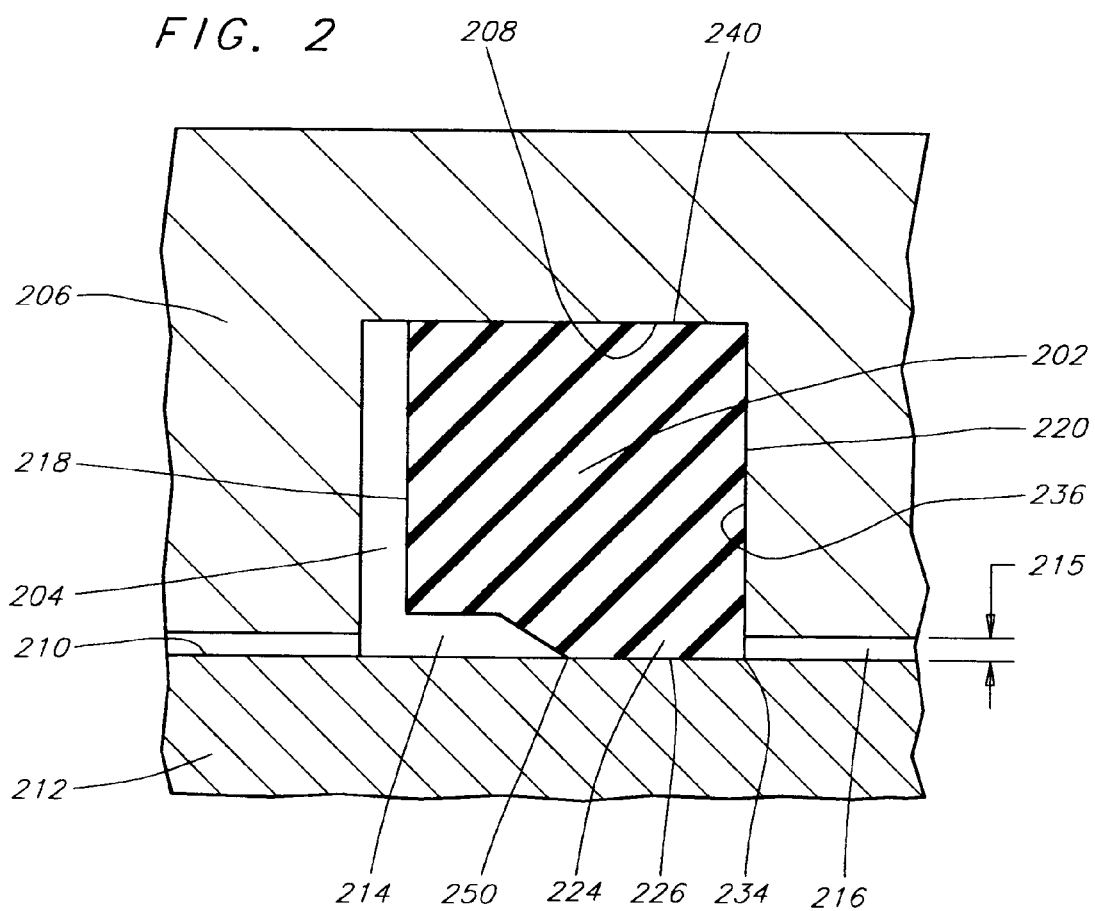

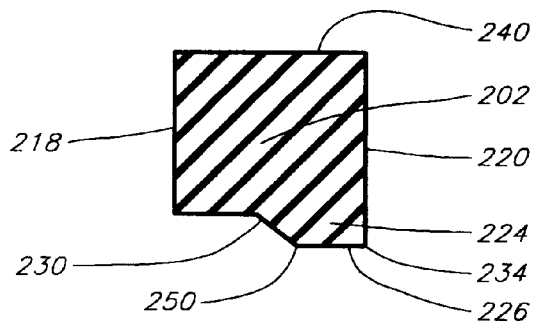
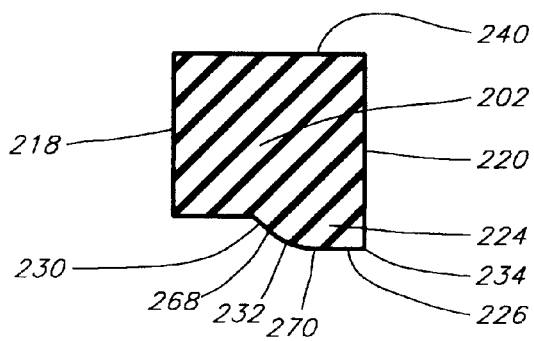
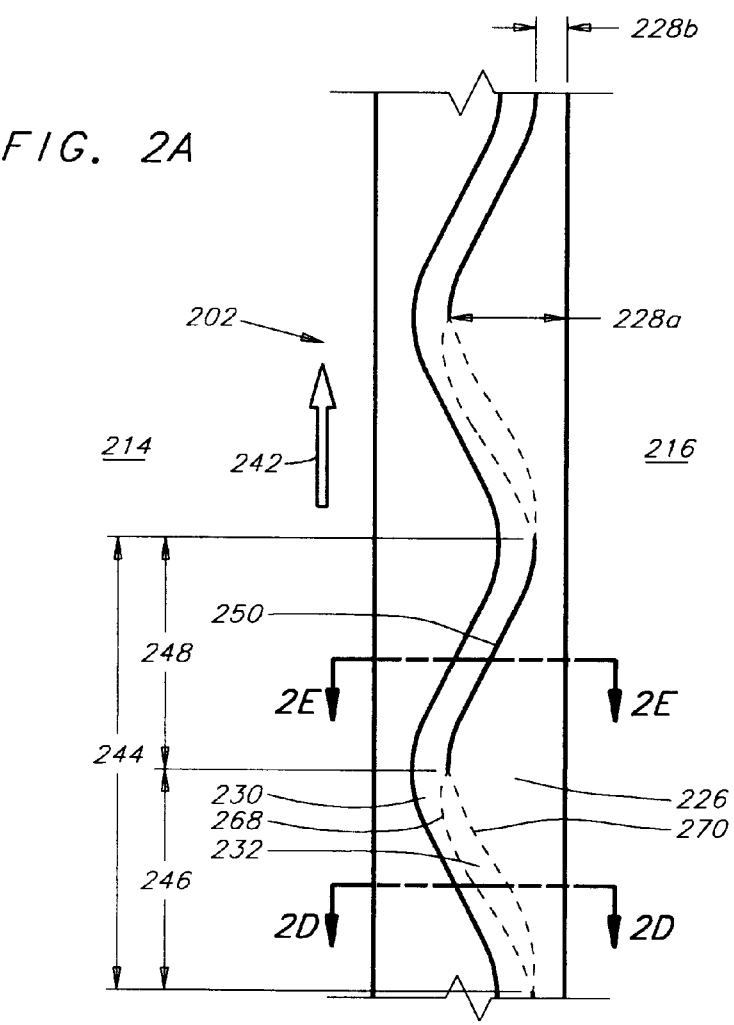

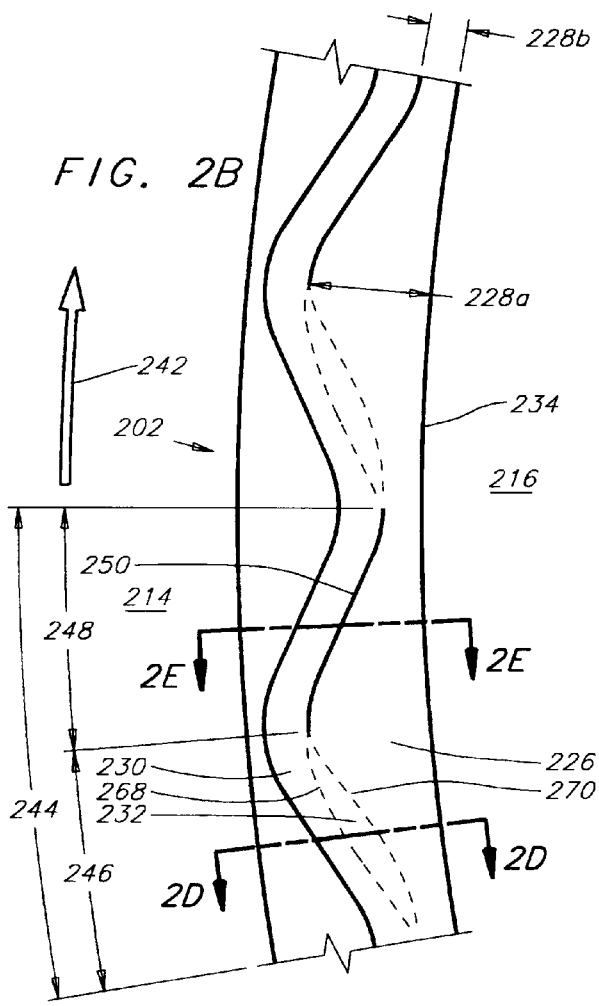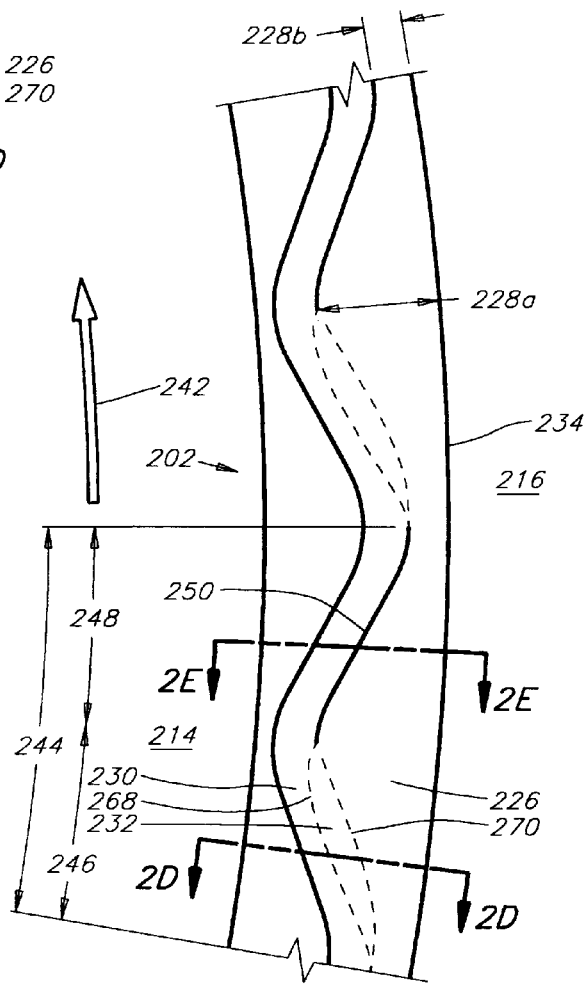

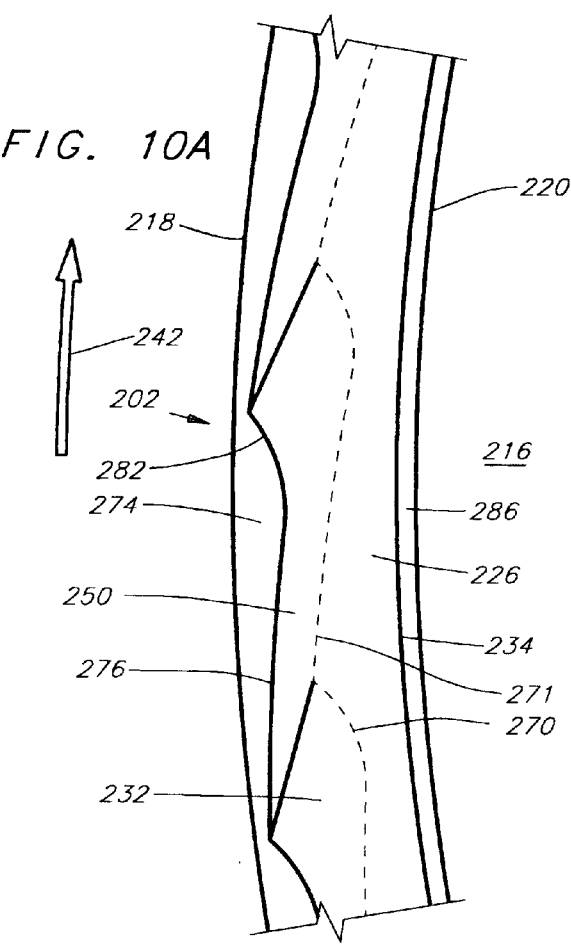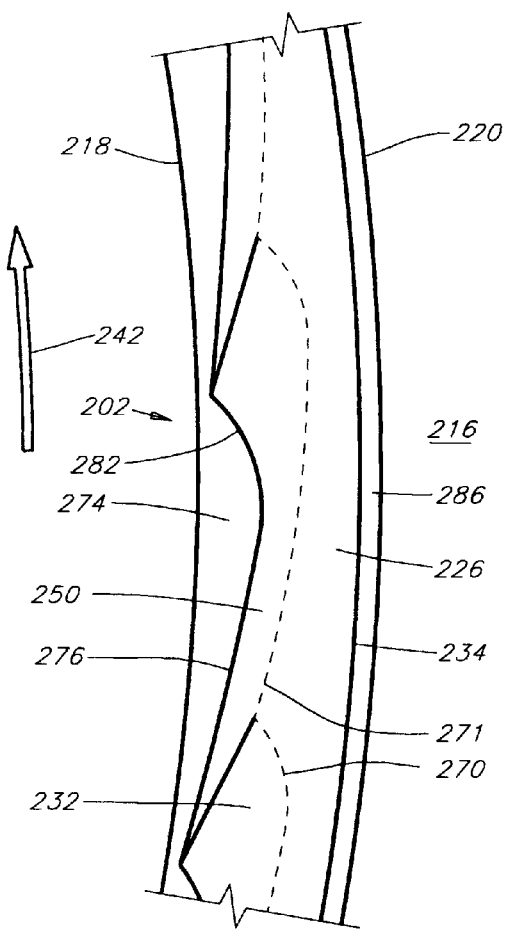

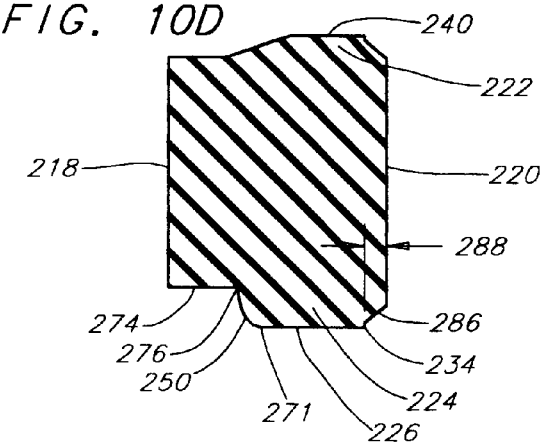
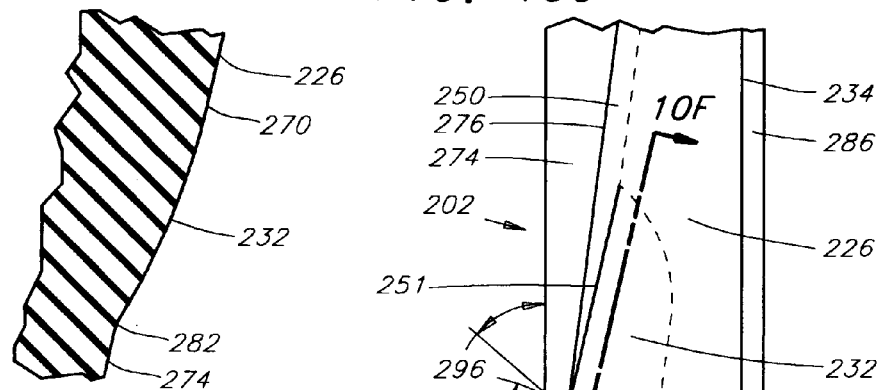
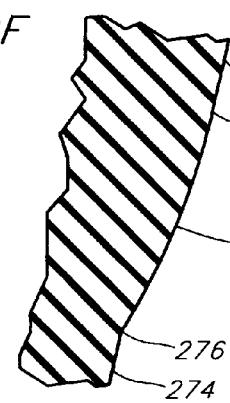
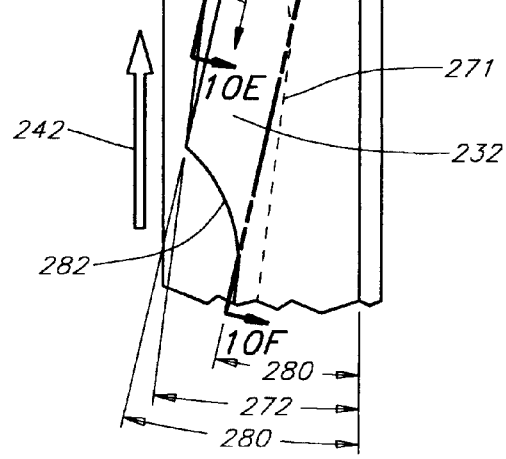

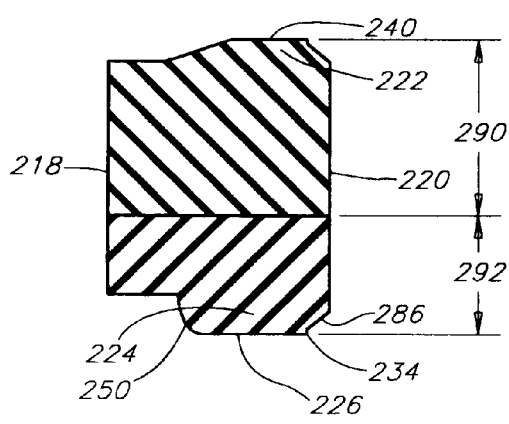
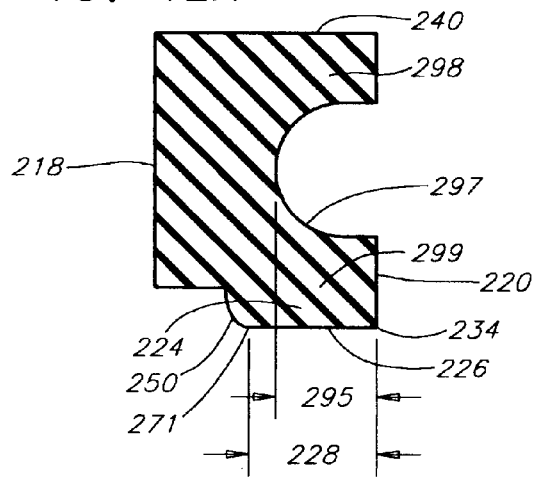
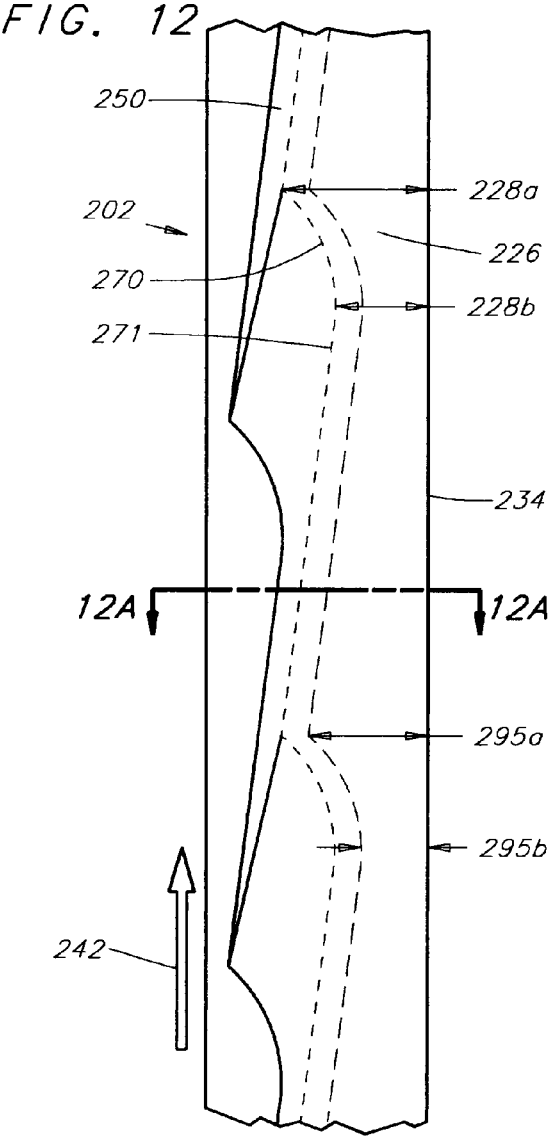

ion direction 42 as a result of being tangent to wavy lubricant-side 30. Hydrodynamic inlet 32 is a simple longitudinally oriented radius which is the same size on both the leading edge 46 and trailing edge 48.

ROTARY SEAL WITH ENHANCED LUBRICATION AND CONTAMINANT FLUSHING

This application claims the benefit of U.S. Provisional Application Ser. No. 60/045,791 filed May 7, 1997 and entitled "Rotary Seal with Enhanced Hydrodynamic Film Thickness".

This invention was made with United States Government support under Contract No. DE-AC03-90ER80939 awarded by the Department of Energy. The United States Government therefore has certain rights in this invention.

BACKGROUND OF THE INVENTION

1. Field of the Invention

This invention relates generally to rotary seals for establishing sealing between a rotary element and a static element for lubricant retention and environment exclusion. More particularly the present invention relates to resilient rotary shaft seals suitable for hydrodynamically lubricating the dynamic sealing interface between a resilient sealing element and a relatively rotatable surface and having means for restricting and diverting lubricant for the purpose of enhancing lubricant film thickness in the sealing interface and causing lubricant movement toward the environment for interface flushing activity and for ensuring adequate lubrication of the entire dynamic sealing surface.

2. Description of Prior Art

Hydrodynamically lubricated rotary shaft seals marketed by Kalsi Engineering, Inc. of Sugar Land, Tex. under the registered trademark "Kalsi Seals" are used for lubricant retention and environment exclusion. FIG. 1 represents prior art constructed in accordance with the principles of U.S. Pat. Nos. 4,610,319 and 5,230,520 commonly assigned herewith and described herein to convey the distinction between prior art and the present invention. FIG. 1 is a cross-sectional view representing the uncompressed cross-sectional shape of ring shaped, resilient interference-type prior art hydrodynamic seal 2 configured for sealing against a relatively rotatable surface (not shown) of cylindrical form. In service, hydrodynamic seal 2 is installed in a circular seal groove (not shown) and compressed between a groove counter-surface and a relatively rotatable surface and used to separate a lubricant from an environment. From an overall orientation standpoint, surface 18 is oriented toward the lubricant, and surface 20 is oriented toward the environment. Surface 20 is positioned so that circular dynamic sealing lip 24 is largely supported by an environment side groove wall to help resist extrusion.

When hydrodynamic seal 2 is installed in a circular seal groove, static sealing surface 40 of circular protruding static sealing lip 22 is compressed against a cylindrical groove counter-surface. The protruding circular dynamic sealing lip 24 defines dynamic sealing surface 26 which is compressed against the relatively rotatable surface. The circular seal groove is sized to hold hydrodynamic seal 2 in compression against the relatively rotatable surface, thereby initiating a sealing relationship with the groove counter-surface and the relatively rotatable surface. When relative rotation occurs between the circular seal groove and the relatively rotatable surface, hydrodynamic seal 2 remains stationary with respect to the groove counter-surface maintaining a static sealing relationship therewith, while the interface between the circular dynamic sealing lip 24 and the relatively rotatable surface becomes a dynamic sealing interface. The lubricant side of circular dynamic sealing lip 24 has a gradually converging relationship with the relatively rotatable surface a result of hydrodynamic inlet 32 which is tangent to lubricant-side 30 at tangency location 68 and to dynamic sealing surface 26 at tangency location 70. Tangency location 68 and tangency location 70 are represented by dashed lines which show the limits of hydrodynamic inlet 32. For illustrative purposes, the relative rotation direction is assumed to be in the direction depicted by arrow 42. Relative to the relative rotation direction 42, each of the waves 44 of dynamic sealing surface 26 have a leading edge 46 and trailing edge 48. Hydrodynamic inlet 32 positionally varys in a wavy pattern relative to the relative rotation direction 42 as a result of being tangent to wavy lubricant-side 30. Hydrodynamic inlet 32 is a simple longitudinally oriented radius which is the same size on both the leading edge 46 and trailing edge 48.

Interrelation of the circular exclusionary geometry 34 and wavy lubricant-side 30 of circular dynamic sealing lip 24 provides dynamic sealing surface 26 with a varying width, including maximum width 28A and minimum width 28B which causes dynamic sealing surface 26 to have a series of waves 44. Width 38 of static sealing surface 40 is approximately the same as the average of 28A and 28B to provide approximate compressive symmetry to minimize compression-induced seal twisting.

In response to relative rotation between hydrodynamic seal 2 and the relatively rotatable surface, the positionally varying, gradually converging relationship between the lubricant side of circular dynamic sealing lip 24 and the relatively rotatable surface generates a hydrodynamic wedging action which introduces a lubricant film between the dynamic sealing surface 26 and the relatively rotatable surface and in the process produces minute lubricant leakage into the environment.

Abrupt circular exclusionary geometry 34 produces a local increase in interfacial contact pressure in the dynamic sealing interface between dynamic sealing surface 26 and the relatively rotatable surface and does not generate a hydrodynamic wedging action, thereby excluding the environment from the dynamic sealing interface.

DESCRIPTION OF THE PROBLEM

The lubricant film in the dynamic sealing interface is thin, and not uniform in thickness across the width of the dynamic sealing interface. The resulting lubrication of dynamic sealing surface 26 is uneven, and surface asperity contact and resulting rubbing wear sometimes occurs between dynamic sealing surface 26 and the relatively rotatable surface. The greatest film thickness occurs toward the lubricant side of the dynamic sealing interface, and the least occurs toward the environment side.

Film thickness and resulting lubrication of dynamic sealing surface 26 is greatest in the region of waves 44 of dynamic sealing surface 26 because a large portion of the lubricant wedged in to the dynamic sealing interface at leading edge 46 simply leaks out at trailing edge 48, and only a much smaller portion is forced toward circular exclusionary geometry 34. As a result, the width 28b of dynamic sealing surface 26 is less well lubricated than the waves 44.

Although prior art seals perform adequately in many applications, there are many applications where increased lubricant film thickness and/or lubricant leakage are needed. For example, if rotational speed is relatively slow and width 28b of dynamic sealing surface 26 is relatively wide, and lubricant viscosity is relatively low, prior art lubrication can be marginal. In other applications a thicker film could provide cooler operation to permit higher speed and use of thinner lubricants, and a higher leak rate would improve contaminant flushing action.

SUMMARY OF THE INVENTION

The present invention is an improved resilient, ring shaped interference-type hydrodynamic rotary seal which provides increased film thickness and flushing action compared to prior art by creating one or more contact pressure induced, angulated restrictions formed by abrupt restrictive diverter means. The angulated restrictions can be produced by various manner of abrupt restrictive diverter, such as projecting ridges, corners at the trailing edge of the waves, or simply by use of a converging shape at the trailing edge of the waves which is more abrupt than the gently converging hydrodynamic inlet shape at the leading edge of the waves. The abrupt restrictive diverter performs two functions; a restricting function and a diverting function, as described hereafter.

The angulated restrictions resulting from the abrupt restrictive diverter cause a local film thickness restriction which produces a damming effect which prevents a portion of the lubricant from leaking out of the dynamic sealing interface at the trailing edge of the wave, and results in a much thicker lubricant film thickness under the waves. This contributes to more film thickness in the remainder of the dynamic sealing interface toward the environment because film thickness tends to decay gradually rather than abruptly due to the relative stiffness of the seal material. Because of the angle of the abrupt restrictive diverter relative to the relative rotation direction, in conjunction with the restriction or damming effect, a strong diverting action is produced which pumps lubricant across the dynamic sealing interface toward the environment. The abrupt restrictive diverter diverts lubricant toward the environment which would otherwise, in absence of the abrupt restrictive diverter, simply leak out at the trailing edge of the waves. This diverting action is so strong that the seal can actually act as a miniature pump to produce substantial pressure in a closed environment-side chamber.

The lubricant diversion is caused by the component of the rotational velocity tangent to the abrupt restrictive diverter. If the angle is relatively small, the component velocity is nearly equal to the rotational velocity, and the diverting action is therefore very strong. The component of rotational velocity normal to the abrupt restrictive diverter causes a portion of the lubricant film to be pumped past the abrupt restrictive diverter, thereby assuring adequate lubrication thereof.

The non-circular hydrodynamic geometry and the restrictive diverter means cause a net leakage of the film of lubricant from the sealing interface into the environment, which provides a flushing action which flushes environmental contaminants away from the sealing interface.

The invention has application where a relatively rotatable surface of cylindrical form is sealed with respect to a housing with either being the rotary member. In such cylindrical sealing arrangements, the seal is compressed radially, and the waves incorporating abrupt restrictive diverter can be on the inside or outside of the seal, as desired. Alternately, the waves incorporating abrupt restrictive diverter can be on an end of the seal for use a face type seal against a relatively rotatable surface of planar form. In such face sealing arrangements, the seal is compressed axially, and the waves incorporating abrupt restrictive diverter can face inward or outward, depending on lubricant location.

INVENTION BENEFITS

The improvement in interfacial lubrication provided by the invention makes the seal suitable for a wider range of service conditions compared to prior art, including faster and slower rotary speeds, higher differential pressures, and thinner lubricants. The increased film thickness produces significantly less torque than prior art, resulting in less self-generated heat, better tolerance to high ambient environment temperature, less heat-related compression set, and longer elastomer life. The cooler seal temperature provides a useful increase in seal stiffness compared to prior art, which provides increased extrusion resistance. The invention is also less susceptible to torque fluctuations which can damage the static sealing lip and mating groove countersurface. The improved lubrication permits use of less abrasion resistant seal materials, and stiffer materials, compared to prior art. The invention can support full hydrodynamic lubrication over an exceptionally wide dynamic sealing interface, and can therefore tolerate more environment-end extrusion damage than prior art.

The increased lubricant leakage also provides a stronger flushing action. Testing has demonstrated that the invention is also superior to prior art when subjected to environment pressure which is higher than lubricant pressure, particularly when the environment contains abrasives.

The invention accomplishes the aforementioned benefits by implementing a simple, compact abrupt restrictive diverter. The resulting seal can fit into the same groove as existing hydrodynamic seals, and does not require modification to existing hardware.

BRIEF DESCRIPTION OF THE DRAWINGS

So that the manner in which the above recited features, advantages and objects of the invention, as well as others which will become apparent, are attained and can be understood in detail, a more particular description of the invention, briefly summarized above, may be had by reference to the embodiments thereof documented in the drawings and accompanying text which follow. It is to be noted, however, that the drawings illustrate only typical embodiments of this invention, and are not to be considered limiting of its scope, for the invention admits to many other equally effective embodiments which vary only in specific detail. In the drawings:

FIG. 1 is a sectional view of a hydrodynamic seal representing the prior art and embodying the subject matter of U.S. Pat. Nos. 4,610,319 and 5,230,520, commonly assigned herewith;

FIG. 2 is a fragmentary cross-sectional view representing the cross-sectional configuration of a ring shaped hydrodynamic seal embodying the principles of the present invention;

FIG. 2A is a fragmentary view of an uncompressed hydrodynamic seal embodying the principles of the present invention which is configured for sealing against a relatively rotatable cylindrical surface;

FIGS. 2B and 2C are fragmentary views of uncompressed hydrodynamic seals as configured (by twisting or manufacture) for sealing against a relatively rotatable planar surface;

FIG. 2D is a cross-sectional illustration taken along line 2D—2D of FIGS. 2A, 2B and 2C;

FIG. 2E is a cross-sectional illustration taken along line 2E—2E of FIGS. 2A, 2B and 2C;

FIG. 3 is a cross-sectional illustration showing the abrupt restrictive diverter takes the form of a generally elliptical shape which has tighter curvature than the hydrodynamic inlet at the leading edge of the wave;

FIG. 4 is a cross-sectional illustration showing the abrupt restrictive diverter taking the form of an external corner;

FIG. 5 is a cross-sectional illustration showing the abrupt restrictive diverter taking the form of a triangular projection;

FIG. 6 is a cross-sectional illustration showing the abrupt restrictive diverter taking the form of a rounded projection located at the lubricant-side extremity of the dynamic sealing surface;

FIG. 7 is a cross-sectional illustration showing the abrupt restrictive diverter taking the form of a rounded projection located away from lubricant-side extremity of dynamic sealing surface;

FIG. 8 is a cross-sectional illustration showing the abrupt restrictive diverter taking the form of a step;

FIGS. 10A and 10B are fragmentary end views showing the preferred embodiment as configured for sealing against a relatively rotatable surface of planar form;

FIG. 10C is a fragmentary view showing the hydrodynamic seal of the preferred embodiment;

FIG. 10D is a cross-sectional illustration taken along line 10D—10D of FIG. 10C;

FIG. 10E is a fragmentary illustration taken along line 10E—10E of FIG. 10C;

FIG. 10F is a fragmentary illustration taken along line 10F—10F of FIG. 10C;

FIG. 11 is a cross-sectional illustration showing a dual modulus hydrodynamic seal embodying the principles of the present invention and representing an alternative embodiment;

FIG. 12 is a fragmentary view showing the hydrodynamic seal of the preferred embodiment and showing the geometry of the seal in relation to rotation direction of the relatively rotatable surface;

FIG. 12A is a cross-sectional illustration taken along line 12A—12A of FIG. 12 and showing a hydrodynamic seal embodying the principles of the present invention and representing an alternative embodiment having a circular groove formed therein to permit control of the interfacial contact pressure of the dynamic sealing lip with the relatively rotatable surface;

Figure 2F:
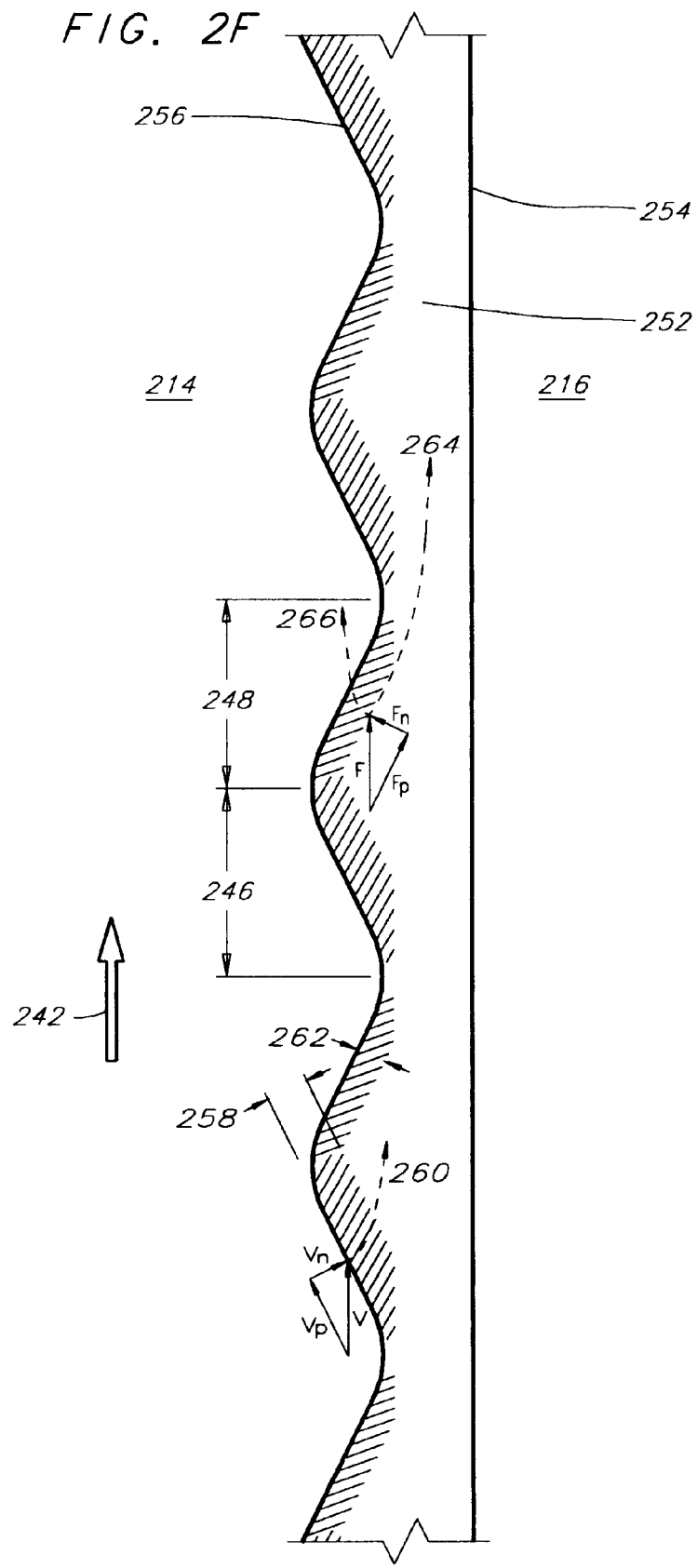
FIG. 2F is a flat development of a fragmentary portion of the footprint of the dynamic sealing interface of the cylindrically sealing embodiment of the present invention.

DESCRIPTION OF TYPICAL IMPLEMENTATIONS OF THE PRESENT INVENTION IN CONJUNCTION WITH FIGS. 2–2F

FIG. 2 is a fragmentary cross-sectional view representing the cross-sectional configuration of ring shaped hydrodynamic seal 202 of the present invention when located in a circular seal groove 204 defined by machine component 206 and compressed between groove counter-surface 208 of seal groove 204 and relatively rotatable surface 210 defined by machine component 212. Relatively rotatable counter-surface 210 can take the form of an externally or internally oriented substantially cylindrical surface, as desired, with hydrodynamic seal 202 compressed radially between groove counter-surface 208 and relatively rotatable surface 210.

Alternatively, relatively rotatable surface 210 can take the form of a substantially planar surface, with hydrodynamic seal 202 compressed axially between groove counter-surface 208 of planar form and relatively rotatable surface 210. The cross-section of FIG. 2 is representative of the trailing edge of a wave.

In the case of relatively large diameter seals, dynamic sealing surface 226 can simply be manufactured as an internally oriented cylindrical surface configured for sealing against a relatively rotatable surface 210 defining an externally oriented cylindrical surface. The cross-section of a large diameter seal is torsionally limp, and can be twisted 180° so that dynamic sealing surface 226 becomes an externally oriented cylindrical surface configured for sealing against a relatively rotatable surface 210 defining an internally oriented cylindrical surface, or twisted 90° so that dynamic sealing surface 226 becomes a planar surface configured for sealing against a relatively rotatable surface 210 of planar form. The relative torsional stiffness of small diameter seals is higher, making twisting less practical, and it is preferred that dynamic sealing surface 226 be pre-oriented in the required cylindrical or planar configuration at the time of manufacture.

FIG. 2A is a fragmentary view of uncompressed hydrodynamic seal 202 as configured for sealing against a relatively rotatable surface of cylindrical form. In FIG. 2A, dynamic sealing surface 226 takes cylindrical form, as appropriate for sealing against a relatively rotatable surface of cylindrical form. In FIG. 2A, the cylindrical diameter of dynamic sealing surface 226 is illustrated as the seal would appear if a short portion was forced flat, or if the diameter of dynamic sealing surface 226 were relatively large or infinite so that curvature of dynamic sealing surface 226 did not cause significant curvature foreshortening of circumferential lengths.

FIGS. 2B and 2C are fragmentary views of uncompressed hydrodynamic seal 202 as configured (by twisting or manufacture) for sealing against a relatively rotatable surface of planar form. Dynamic sealing surface 226 and static sealing surface 240 (not shown in FIGS. 2B and 2C) take substantially planar form, as appropriate for sealing against a relatively rotatable surface of planar form. In FIG. 2B dynamic sealing surface 226 and circular exclusionary geometry 234 are positioned for having the environment toward the inside of the seal, and in FIG. 2C they are positioned for having the environment toward the outside of the seal.

FIG. 2D is a section view representative of cutting plane 2D—2D which is taken halfway along the leading edge 246 of a wave, and FIG. 2E is a section view representative of cutting plane 2E—2E which is taken halfway along the trailing edge 248 of a wave. The section views in FIGS. 2D and 2E are applicable to the cutting plane locations indicated in FIGS. 2A, 2B, and 2C.

Referring now to FIGS. 2–2E, hydrodynamic seal 202 separates the lubricant supply 214 from the environment 216 to prevent environment from contaminating the lubricant. From an overall orientation standpoint, surface 218 of hydrodynamic seal 202 is oriented toward lubricant supply 214, and surface 220 is oriented toward environment 216. Hydrodynamic seal 202 may be composed of any suitable sealing material, including elastomeric or rubber-like materials and various polymeric materials. Hydrodynamic seal 202 may also incorporate different materials bonded together to form a composite structure, per the teachings of U.S. Pat. No. 5,738,358, commonly assigned herewith.

When hydrodynamic seal 202 is installed in circular seal groove 204, circular static sealing surface 240 is compressed against groove counter-surface 208. A protruding circular dynamic sealing lip 224 defines dynamic sealing surface 226 which is compressed against relatively rotatable surface 210. Circular seal groove 204 is sized to hold hydrodynamic seal 202 in compression against relatively rotatable surface 210, thereby initiating a static sealing relationship with groove counter-surface 208 and relatively rotatable surface 210 in the same manner as any conventional interference type seal, such as an O-Ring.

When relative rotation is absent, a liquid tight static sealing relationship is maintained at the interface between static sealing surface 240 and groove counter-surface 208, and at the interface between circular dynamic sealing lip 224 and relatively rotatable surface 210. When relative rotation occurs between machine component 206 and machine component 212, the hydrodynamic seal remains stationary with respect to groove counter-surface 208 and maintains a static sealing relationship therewith, while the interface between circular dynamic sealing lip 224 and relatively rotatable surface 210 becomes a dynamic sealing interface. The relative rotation direction is normal (perpendicular) to the plane of the cross-section depicted in FIG. 2, and approximately concentric to surface 220.

Abrupt circular exclusionary geometry 234 produces a local increase in interfacial contact pressure between dynamic sealing surface 226 and relatively rotatable surface 210 and does not generate a hydrodynamic wedging action, and thereby excludes the environment from the dynamic sealing interface between dynamic sealing surface 226 and relatively rotatable surface 210 per the teachings of U.S. Pat. No. 4,610,319. Surface 220 is positioned so that circular dynamic sealing lip 224 is largely supported by environment side groove wall 236 to resist distortion and extrusion of seal material into the circular extrusion gap 215 when the seal is subjected to hydrostatic force resulting from lubricant pressure acting over the area between groove counter-surface 208 and relatively rotatable surface 210. FIG. 2 illustrates the seal being forced against environment side groove wall 236 by said hydrostatic force.

Interrelation of circular exclusionary geometry 234 and wavy lubricant-side 230 of circular dynamic sealing lip 224 provide dynamic sealing surface 226 with a varying width, including locations of maximum width as shown at 228a and locations of minimum width as shown at 228b which cause dynamic sealing surface 226 to have a series of waves 244.

Relative to the relative rotation direction 242, each of the waves 244 of dynamic sealing surface 226 have a leading edge 246 and trailing edge 248. Where dynamic sealing surface 226 of circular dynamic sealing lip 224 is compressed against the relatively rotatable surface 210, a dynamic sealing interface (depicted in FIG. 2F) is established which has a wavy edge on the lubricant side and a non-wavy edge on the environmental side.

Leading edge 246 of waves 244 incorporates hydrodynamic inlet 232, which is tangent to wavy lubricant-side 230 at tangency location 268 and to dynamic sealing surface 226 at tangency location 270. Hydrodynamic inlet 232 can take the form of a true radius or other specific form such as a portion of an ellipse without departing from the spirit or scope of the present invention.

When installed, leading edge 246 of the lubricant side of circular dynamic sealing lip 224 has a gradually converging relationship with relatively rotatable surface 210 as a result of hydrodynamic inlet 232, which is designed to avoid an abrupt rise in interfacial contact pressure at the leading edge 246 of the wave conducive to providing efficient hydrodynamic wedging action. Hydrodynamic inlet 232 is positionally varying relative to relative rotation direction 242 as a result of being tangent to wavy lubricant-side 230. In response to relative rotation between hydrodynamic seal 202 and relatively rotatable surface 210 in relative rotation direction 242, the positionally varying, gradually converging relationship between the lubricant side of circular dynamic sealing lip 224 and relatively rotatable surface 210 generates a hydrodynamic wedging action which introduces a lubricant film into the dynamic sealing interface between dynamic sealing surface 226 and relatively rotatable surface 210.

Trailing edge 248 of waves 244 incorporates at least one abrupt restrictive diverter element 250 which is located between wavy lubricant-side 230 and dynamic sealing surface 226. The restrictive diverter or diverters are of discontinuous, i.e., non-circular character so that they will not inhibit hydrodynamic wedging of lubricant from the lubricant supply into the dynamic sealing interface of the seal. When installed, trailing edge 248 of the lubricant side of circular dynamic sealing lip 224 has an abrupt relationship with relatively rotatable surface 210 as a result of abrupt restrictive diverter 250 which is designed to create an abrupt rise in interfacial contact pressure conducive to providing a restrictive action which restricts the leakage of lubricant at the trailing edge 248 of the wave and therefore enhances film thickness to improve seal lubrication.

Abrupt restrictive diverter 250 is positionally varying or skewed in orientation relative to the relative rotation direction 242. In response to relative rotation between hydrodynamic seal 202 and relatively rotatable surface 210, the positionally varying, abrupt relationship between abrupt restrictive diverter 250 and relatively rotatable surface 210 diverts lubricant toward circular exclusionary geometry 234 to improve seal lubrication.

In FIGS. 2A, 2B and 2C tangency location 268 and tangency location 270 are represented by dashed lines which show the limits of hydrodynamic inlet 232. The size of hydrodynamic inlet 232 can start small at the narrowest width 228b of dynamic sealing surface 226, can increase at the median width, and can then decrease at the widest width 228a. The varying size of hydrodynamic inlet 232 can achieve a gradual transition between the gradually converging geometry of leading edge 246 and abrupt restrictive diverter 250 of trailing edge 248. The shape of hydrodynamic inlet 232 and the shape and location and specific geometry of abrupt restrictive diverter 250 can take other specific form without departing form the spirit or scope of the present invention. The abrupt restrictive diverter 250 need not be present on each and every wave of the seal; for example, incorporation of abrupt restrictive diverter 250 on only every other wave would moderate the leak rate and provide inproved tolerance of bidirectional rotation. Abrupt circular exclusionary geometry 234 at the environmental side of circular dynamic sealing lip 224 is aligned with the relative rotation direction 242, and therefore does not generate a hydrodynamic wedging action with environment 216 in response to relative rotary motion, and thereby functions to exclude the environment from the dynamic sealing interface between dynamic sealing surface 226 and the relatively rotatable surface 210. Abrupt circular exclusionary geometry 234 also produces a local interfacial contact pressure increase between dynamic sealing surface 226 and relatively rotatable surface 210 which tends to exclude environmental contaminants from the sealing interface.

DISCUSSION OF THEORY

A flat development of a fragmentary portion of the footprint of dynamic sealing interface 252 of the cylindrically sealing embodiment shown in FIG. 2A is shown in FIG. 2F. The footprint environmental edge 254, which is defined by circular exclusionary geometry 234 of the seal, is aligned with the relative rotation direction 242. Footprint lubricant edge 256 is wavy. The boundary definition of the lubricant side waves can vary from the illustrated shape without departing from the spirit or scope of the present invention. (The footprint geometry of FIG. 2F can also be used to visualize the theory of the face sealing embodiments of FIGS. 2B and 2C if the diameter of the seal is visualized as being very large or infinite.)

Each wave on the lubricant edge of the interfacial footprint has a leading edge 246 and a trailing edge 248 relative to the relative rotation direction 242 and corresponding to the leading edge 246 and trailing edge 248 of the seal waves. As described previously, the local geometry of the circular dynamic sealing lip 224 is constructed in a gradually converging shape such that the interfacial contact pressure rises gradually in the leading edge interfacial zone 258 adjacent to leading edge 246. The net result of the gradually converging shape and the gradually rising interfacial contact pressure is a hydrodynamic wedging action which introduces a film of lubricant into the dynamic sealing interface as relative rotation takes place due to the normal component Vn of the rotational velocity V. The path of the lubricant into the interface is shown schematically by the dashed line 260. The hydrodynamic wedging action causes a controlled pumping action from footprint lubricant edge 256 to footprint environmental edge 254 which results in lubricant leakage from dynamic sealing interface 252 into environment 216. Not all of the lubricant pumped into the dynamic interfacial zone at the leading edge interfacial zone 258 exits at the footprint environmental edge 254; a portion exits at the trailing edge 248.

As described previously, the local geometry of circular dynamic sealing lip 224 at trailing edge 248 is constructed in an abrupt shape such that interfacial contact pressure rises abruptly in trailing edge interfacial zone 262 adjacent to trailing edge 248. Trailing edge interfacial zone 262 is skewed with respect to relative rotation direction 242. The net result of the abruptly rising interfacial contact pressure is a corresponding local film thickness reduction at or near the trailing edge interfacial zone 262 which locally brings dynamic sealing surface 226 closer to relatively rotatable surface 210 and creates a lubricant damming effect. The restricting or damming effect causes an increase in film thickness in the region between leading edge 246 and trailing edge 248 and minimizes leakage toward lubricant supply 214. The increased film thickness doesn't end abruptly at the low points in the wave; rather it tapers off slowly toward footprint environmental edge 254 due to the rigidity of circular dynamic sealing lip 224. This effect enhances the leakage induced contaminant flushing action, and provides increased lubrication of the dynamic sealing interface near footprint environmental edge 254.

A portion of the lubricant film in dynamic sealing interface 252 which is closest to the relatively rotatable surface moves in roughly the same direction as the relative rotation direction 242. As the moving lubricant film approaches trailing edge interfacial zone 262, a significant proportion of the lubricant is diverted toward footprint environmental edge 254 due to parallel component Fp of the film velocity F. The diversion causes lubricant that would otherwise exit at trailing edge 248 to instead add to the film thickness in the interfacial zone near the footprint environmental edge 254, and adds to the overall leakage rate and contaminant flushing action into environment 216. The path of the lubricant diverted toward footprint environmental edge 254 is schematically represented by dotted line 264.

Not all of the lubricant is diverted toward footprint environmental edge 254. A portion of the lubricant escapes at trailing edge 248 due to normal component Fn of film velocity F. This lubricant path is represented schematically by dotted line 266. The lubricant escaping at trailing edge 248 serves to lubricate trailing edge interfacial zone 262.

Footprint environmental edge 254 is aligned with the relative rotation direction 242 and does not impart a hydrodynamic wedging action, per the teachings of U.S. Pat. No. 4,610,319 and thereby excludes the environment. Abrupt circular exclusionary geometry 234 which defines footprint environmental edge 254 produces a local increase in interfacial contact pressure which also tends to exclude the environment.

DESCRIPTION OF ALTERNATE EMBODIMENTS OF ABRUPT RESTRICTIVE DIVERTER IN CONJUNCTION WITH FIGS. 3–9A.

The abrupt restrictive diverter described above can take many suitable alternate embodiments without departing from the spirit and scope of the present invention, as shown by example in the cross-sectional views representative of the trailing edge of a wave of hydrodynamic seal 202 in FIGS. 3–9A.

Several features in FIGS. 3–9A are numbered for the purpose of orienting the reader, as follows: static sealing surface 240, circular dynamic sealing lip 224, dynamic sealing surface 226, circular exclusionary geometry 234, surface 218 which would be oriented toward the lubricant, and surface 220 which would be oriented toward the environment. The principle geometric feature of the present invention is the abrupt restrictive diverter 250, of one form or another, which is typically skewed relative to the relative rotation direction.

Figure 3:
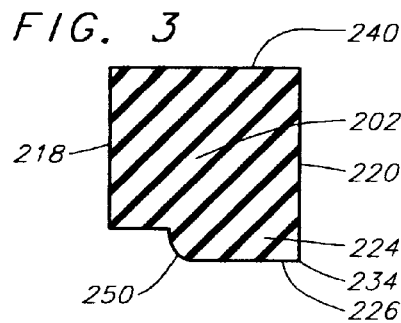
FIGS. 3–8 are cross-sections taken normal to the direction of rotation which are representative of the trailing edge of a wave.

FIGS. 3–8 are cross-sections taken normal to the direction of rotation which are representative of the trailing edge of a wave. In FIG. 3 the abrupt restrictive diverter 250 takes the form of a generally elliptical shape which has tighter curvature and is more abrupt than the hydrodynamic inlet (not shown) at the leading edge of the wave, and therefore provides a more abrupt rise in interfacial contact pressure compared to the leading edge of the wave.

Figure 4:
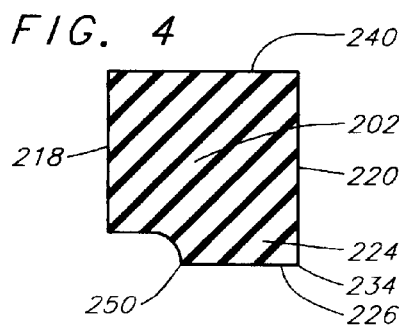

In FIG. 4 the abrupt restrictive diverter 250 takes the form of an external corner.

Figure 5:
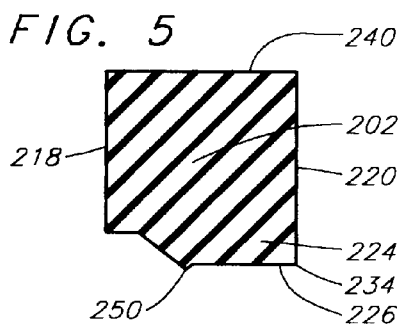

In FIG. 5 the abrupt restrictive diverter 250 takes the form of an angular projection such as a triangular configuration.

Figure 6:
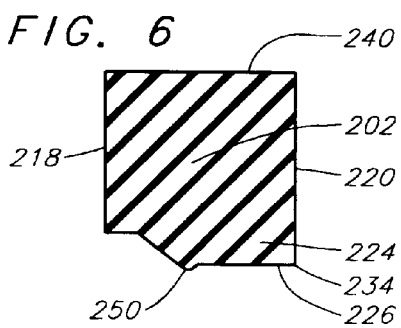

In FIG. 6 the abrupt restrictive diverter 250 takes the form of a rounded projection located at the lubricant-side extremity of the dynamic sealing surface 226.

Figure 7:
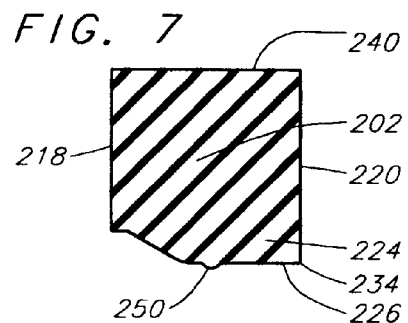

In FIG. 7 the abrupt restrictive diverter 250 takes the form of a rounded projection located away from the lubricant-side extremity of dynamic sealing surface 226.

Figure 8:
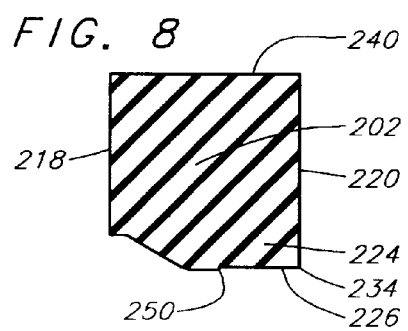

In FIG. 8 the abrupt restrictive diverter 250 takes the form of a step or ledge being skewed in relation to the relative rotation direction.

Figure 9A:
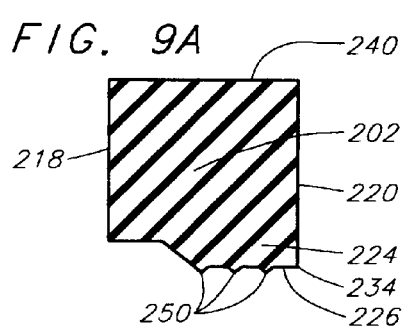
FIG. 9A is a cross-sectional illustration taken at cutting plane 9A—9A of FIG. 9 showing the abrupt restrictive diverter taking the form of a plurality of skewed projections distributed across dynamic sealing surface and being skewed relative to the direction of relative rotation.
Figure 9:
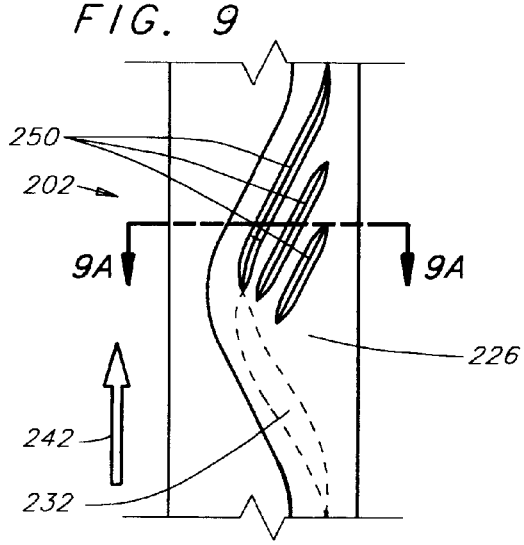
FIG. 9 is a fragmentary view showing a plurality of abrupt restrictive diverters taking the form of skewed projections distributed across the dynamic sealing surface and being skewed relative to the direction of rotation.

In FIGS. 9 and 9A the abrupt restrictive diverter 250 takes the form of a plurality of skewed projections distributed across dynamic sealing surface 226 which are skewed relative to relative rotation direction 242. As shown, the skewed projections can extend onto the leading edge portion of the wave.

DESCRIPTION OF THE PREFERRED EMBODIMENT IN CONJUNCTION WITH FIGS. 10–10F

Figure 10:
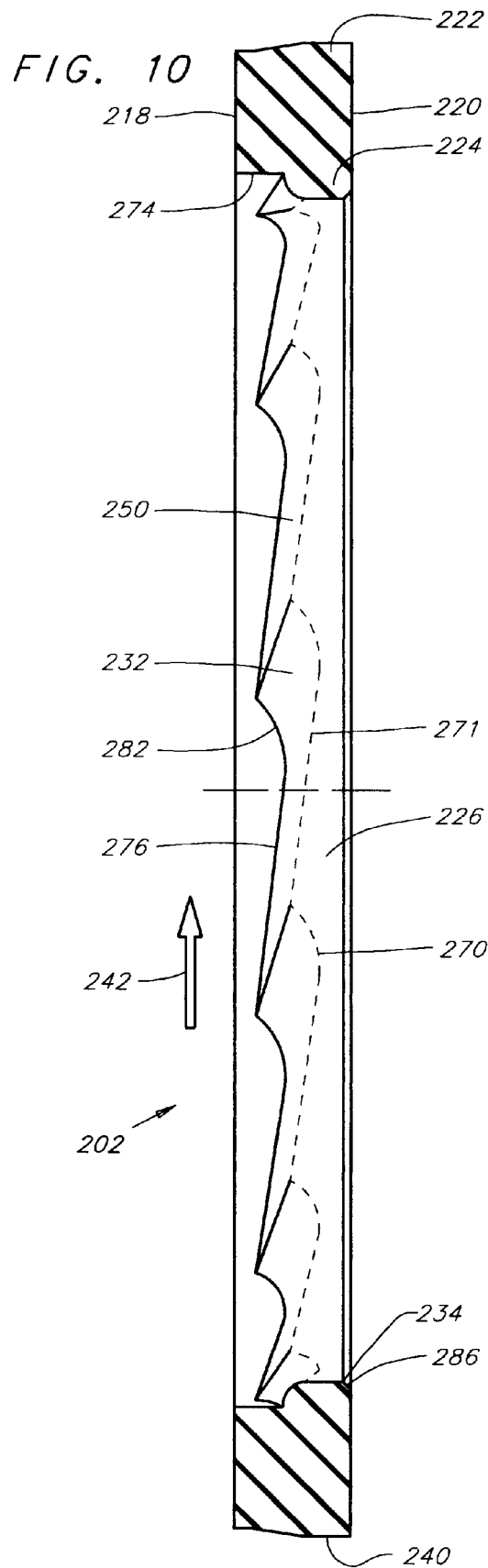
FIG. 10 is a cross-sectional illustration showing the preferred embodiment of the present invention in the un-compressed state thereof and being configured for sealing against a relatively rotatable cylindrical surface.

FIG. 10 shows a full cross-sectional view of the preferred embodiment of un-compressed hydrodynamic seal 202 of the present invention as configured for sealing against a relatively rotatable surface of substantially cylindrical form. In FIG. 10, dynamic sealing surface 226 and static sealing surface 240 take cylindrical form, as appropriate for sealing against a relatively rotatable surface of cylindrical form. Surface 218 and surface 220 are illustrated in planar form, but can take other specific form without departing from the spirit or scope of the invention.

FIGS. 10A and 10B are fragmentary end views of the preferred embodiment of un-compressed hydrodynamic seal 202 as configured for sealing against a relatively rotatable surface of planar form. In FIG. 10A dynamic sealing surface 226 and circular exclusionary geometry 234 are located for having the environment 216 toward the inside of the seal, and in FIG. 10B dynamic sealing surface 226 and circular exclusionary geometry 234 are located for having the environment 216 toward the outside.

In FIGS. 10A and 10B, dynamic sealing surface 226 and static sealing surface 240 (not shown) are of substantially planar form, as appropriate for sealing against a relatively rotatable planar surface. Surface 218 and surface 220 are illustrated as taking cylindrical form, but can take other specific form without departing from the spirit or scope of the invention.

Several features in FIGS. 10, 10A and 10B are numbered for the purpose of orienting the reader, as follows: hydrodynamic inlet 232, static sealing surface 240, circular dynamic sealing lip 224, dynamic sealing surface 226, circular exclusionary geometry 234, surface 218 which would be oriented toward the lubricant, and surface 220 which would be oriented toward the environment. The principle geometric feature of the present invention is abrupt restrictive diverter 250. Abrupt restrictive diverter 250 intersects rebated surface 274 at intersection location 276 as represented by a solid line in FIGS. 10, 10A, 10B and 10C and is tangential to dynamic sealing surface 226 at tangency location 271 as represented by a dashed line.

To better describe and illustrate the unique and complex features of the preferred embodiment portrayed in FIGS. 10, 10A and 10B, an enlarged fragmental view of the preferred embodiment is shown in FIG. 10C, along with section views 10D, 10E and 10F taken therefrom. A seal of relatively large or even infinite diameter is portrayed in FIG. 10C so that the curvature of the seal can be ignored, and so that the view is representative of seals configured for sealing either against a cylindrical or planar relatively rotatable surface. A smaller seal of face sealing configuration would appear as shown in FIG. 10C if a portion of the seal were forced straight, and a smaller seal of cylindrical sealing configuration would appear as shown in FIG. 10C if a portion of the seal were forced flat. Some of the numbered features in FIGS. 10C–10F are also cross-referenced in FIGS. 10–10B for clarity.

Refer now to FIGS. 10C–10F, From an overall orientation standpoint, surface 218 of hydrodynamic seal 202 is oriented toward lubricant supply 214, and surface 220 is oriented toward environment 216. When hydrodynamic seal 202 is installed in a circular seal groove, circular static sealing surface 240 is compressed against a groove countersurface and establishes static sealing relation therewith. The relative rotation direction is shown by arrow 242. The leading edge of the wave incorporates hydrodynamic inlet 232, which is tangent to dynamic sealing surface 226 at tangency location 270, which in FIG. 10–10C is represented by a dashed line. Hydrodynamic inlet 232 intersects rebated surface 274 at intersection location 282, which in FIG. 10–10C is shown by a solid line.

When installed, the leading edge of the lubricant side of circular dynamic sealing lip 224 has a gradually converging relationship with the mating relatively rotatable surface as a result of hydrodynamic inlet 232 which is designed to avoid an abrupt rise in interfacial contact pressure at the leading edge of the wave conducive to providing efficient hydrodynamic wedging action. In response to relative rotation between hydrodynamic seal 202 and a relatively rotatable surface, the positionally varying, gradually converging relationship between the lubricant side of circular dynamic sealing lip 224 and the relatively rotatable surface generates a hydrodynamic wedging action that introduces a lubricant film into the dynamic sealing interface between dynamic sealing surface 226 and the relatively rotatable surface. In prior art seals, the hydrodynamic inlet has been limited to ⅛ inch radius or less due to wave geometry limitations and mold machining limitations related to milling cutter size and mold curvature related over-cutting phenomenon. In the preferred embodiment, these limitations are overcome by radius skew angle 280, which is identified in FIG. 10C. Therefore hydrodynamic inlet 232 can be much larger than in prior art to produce a more gradually converging relationship between the circular dynamic sealing lip 224 and the relatively rotatable surface which produces a stronger hydrodynamic wedging action, compared to prior art. The inventor has successfully designed and produced seals of the preferred embodiment ranging in diameter from 0.438 inches to 42.375 inches which have incorporated a hydrodynamic inlet of 1.95 inch radius, which is over 15 times larger than prior art. The inventor has also successfully designed and produced seals of preferred embodiment having a hydrodynamic inlet as small as 0.49 inch radius. The techniques used to produce these seals are also equally suitable for producing seals having a larger or smaller than quoted radius. The larger radius of the hydrodynamic inlet 232 of the preferred embodiment produces a much stronger wedging action compared to the prior art by virtue of the more gradual convergence between the seal and the relatively rotatable surface which is provided by the larger radius. The hydrodynamic inlet 232 is oriented at skew angle 280, and is therefore nearly aligned with relative rotation direction 242, which is an advantage over the prior art, in which the hydrodynamic inlet radius is always oriented at right angles to the relative rotation direction. The preferred embodiments of the present invention also lend themselves to very short wave pitch, which improves hydrodynamic lubrication by introducing lubricant at many locations about the circumference of the seal. Testing by the inventor and his associates has demonstrated that the use of short wave pitch in the prior art seal can result in diminished hydrodynamic lubrication.

The leading edge of the wave follows the steeply curved trajectory created by trajectory radius 294 which provides the leading edge of the wave with a very steep angle relative to the relative rotation direction 242, culminating in leading edge angle 296 relative to the relative rotation direction. As described previously in conjunction with FIG. 2F, the hydrodynamic wedging action takes place due to the normal component Vn of the rotational velocity V. In the preferred embodiment, component Vn is very large owing to the relatively steep slope of the leading edge of the wave. The leading edge trajectory can take other specific form without departing from the spirit or scope of the invention.

The trailing edge of the wave incorporates abrupt restrictive diverter 250 which is angularly oriented by trailing edge angle 272 relative to circular exclusionary geometry 234, and relative to relative rotation direction 242. When the seal is installed, the trailing edge has an abrupt relationship with the mating relatively rotatable surface as a result of abrupt restrictive diverter 250 which is designed to create an abrupt rise in interfacial contact pressure conducive to providing a restrictive action which restricts the leakage of lubricant at the trailing edge and therefore enhances film thickness. For optimum performance in seals of 7/16 inch to 42.375 inch diameter, the trailing edge angle 272 is typically in the range of 7–11 degrees and the overall wave pitch is typically in the range of 0.45–0.65 inches.

Abrupt restrictive diverter 250 is positionally varying or skewed in orientation relative to the relative rotation direction 242 as a result of trailing edge angle 272. In response to relative rotation between hydrodynamic seal 202 and a relatively rotatable surface, the positionally varying, abrupt relationship between abrupt restrictive diverter 250 and the relatively rotatable surface diverts lubricant toward circular exclusionary geometry 234 to improve seal lubrication. The preferred embodiment of abrupt restrictive diverter 250 also makes the seal footprint less susceptible to width variation (footprint spreading) as a function of compression, which makes the seal less prone to torque variation as a result of compression variation, compared to prior art. FIG. 10D shows the abrupt nature of abrupt restrictive diverter 250 when viewed in a section view taken normal to relative rotation direction 242. FIG. 10E shows that abrupt restrictive diverter 250 when viewed in a section view taken at radius skew angle 280 can have the same curvature as hydrodynamic inlet 232 and is tangent to dynamic sealing surface 226 at tangency location 271 which is portrayed as a dashed line in FIG. 10C. Abrupt restrictive diverter 250 intersects rebated surface 274 at intersection location 276, and hydrodynamic inlet 232 intersects rebated surface 274 at intersection location 282.

Leading edge abrupt restrictive diverter 251 is created by the external corner formed by the intersection of hydrodynamic inlet 232 and abrupt restrictive diverter 250 at radius skew angle 280. When the seal is installed, a portion of leading edge restrictive diverter 251 is located within the footprint of the dynamic sealing interface, and functions in a manner similar to, and complementing, abrupt restrictive diverter 250 to inhibit leakage from the lubricant side of the dynamic sealing interface and toward circular exclusionary geometry 234 and thereby enhance interfacial film thickness and flushingaction.

The preferred machining method used to produce tooling for molding seals of the preferred embodiment, can, if desired, create two separate surface finish parallel grain patterns consisting of a multiplicity of microscopic projections and grooves which are represented by grain pattern arrow 284 oriented at radius skew angle 280 at the leading edge and grain pattern arrow 285 oriented at trailing edge angle 272 at the trailing edge. The surface finish grain pattern serves, by virtue of its skewed orientation relative to relative rotation direction 242, to help guide lubricant toward circular exclusionary geometry 234. For optimum performance in seals of 7/16 to 42.375 diameter, the radius skew angle 280 is typically in the range of 12–18 degrees. The smaller the radius skew angle 280 becomes, the more abrupt that abrupt restrictive diverter 250 becomes, and if radius skew angle 280 is equal to trailing edge angle 272, abrupt restrictive diverter 250 and leading edge restrictive diverter 251 become square external corners.

Abrupt circular exclusionary geometry 234 at the environmental side of circular dynamic sealing lip 224 does not generate a hydrodynamic wedging action with the environment in response to relative rotary motion, and thereby functions to exclude the environment from the dynamic sealing interface between dynamic sealing surface 226 and the relatively rotatable surface. The circular exclusionary geometry 234 also produces a local increase in interfacial contact pressure between dynamic sealing surface 226 and the relatively rotatable surface which tends to exclude environmental contaminants from the sealing interface. The environment side of circular dynamic sealing lip 224 can take other specific form without departing from the spirit or scope of the invention.

The preferred embodiment incorporates flexible transitional geometry 286 to improve extrusion resistance and exclusionary function and regulate local film thickness per the general teaching of U.S. Pat. No. 5,738,358 so that the tendency for seal material to extrude into the circular extrusion gap is minimized. The improved lubrication of the present invention, however, makes the flexible transitional geometry 286 functional and practical in a single modulus seal construction without the complexity of the multiple modulus construction taught in U.S. Pat. No. 5,738,358 because the present invention runs much cooler than prior art single durometer seals, and thereby maintains the local modulus of elasticity at flexible transitional geometry 286 at relatively high and demonstrably useful value compared to prior art. A relatively high modulus of elasticity is required locally at flexible transitional geometry 286 so that it is able to retain it's functional shape and not become flattened, extruded into the circular extrusion gap, and damaged by lubricant pressure acting over its unsupported area. Flexible transitional geometry 286 enhances exclusionary function of circular exclusionary geometry 234 and can be used to regulate lubricant leakage past circular exclusionary geometry 234 seal body material 288 and by the hydraulic force resulting from lubricant pressure (if any) acting over the unsupported seal area of flexible transitional geometry 286.

The preferred embodiment also incorporates a circular static sealing lip 222 in opposed relation to circular dynamic sealing lip 224 per the general teaching of U.S. Pat. No. 5,230,520 to inhibit seal twisting, enhance exclusionary performance of circular exclusionary geometry 234, and minimize flattening of hydrodynamic inlet 232. The shape of static sealing lip 222 is preferred to be a compromise geometry based on an averaging-based approximation of the cross-sectional shape of the compressed portion of circular dynamic sealing lip 224.

DESCRIPTION OF DUAL MODULUS EMBODIMENT IN CONJUNCTION WITH FIG. 11

Referring now to FIG. 11, the preferred embodiment of the invention may also incorporate means, per the teaching of U.S. Pat. No. 5,738,358, comprising the lower modulus of elasticity of a first circular ring-like seal section 290 compared to the modulus of elasticity of a second circular ring-like seal section 292, which enhances extrusion resistance, and which controls the hydrodynamic wedging of the film of lubricant by controlling interfacial contact force between dynamic sealing surface 226 and the relatively rotatable surface by minimizing compression induced distortion of the hydrodynamic inlet (not shown), and by minimizing compression induced distortion of circular dynamic sealing lip 224. Several features in FIG. 11 are numbered for the purpose of orienting the reader, as follows: static sealing lip 222, static sealing surface 240, circular dynamic sealing lip 224, dynamic sealing surface 226, circular exclusionary geometry 234, abrupt restrictive diverter 250, flexible transitional geometry 286, surface 218 which would be oriented toward the lubricant, and surface 220 which would be oriented toward the environment. With the multiple modulus construction in conjunction with abrupt restrictive diverter 250, the resulting improved lubrication provides lower torque, cooler operation, improved extrusion resistance, and improved flushing action compared to prior art multiple modulus seals.

DESCRIPTION OF GROOVED EMBODIMENT IN CONJUNCTION WITH FIGS. 12 & 12A

The low torque, low self-generated heat, and high leakage flushing action of the invention can be further enhanced by means of an environment-side groove formed generally per the teachings of U.S. Pat. No. 5,678,829 commonly assigned herewith, as shown in the fragmentary view of hydrodynamic seal 202 in FIG. 12, and the cross-section thereof in FIG. 12A. Several features in FIGS. 12 & 12A are numbered for the purpose of orienting the reader, as follows: static sealing surface 240, relative rotation direction 242, circular dynamic sealing lip 224, dynamic sealing surface 226, circular exclusionary geometry 234, abrupt restrictive diverter 250, tangency location 270, tangency location 271, surface 218 which would be oriented toward the lubricant, and surface 220 which would be oriented toward the environment.

Generally circular groove 297 defines generally circular flexible body rims 298 and 299 which are flexible toward generally circular groove 297 to control interfacial contact pressure of dynamic sealing surface 226 against a relatively rotatable surface and thus regulate hydrodynamic film thickness and flushing action to a very high level. For optimum flushing action, the depth 295 of the generally circular groove 297 varies in sequence with the local width 228 of dynamic sealing surface 226, but does not exceed local width 228 so that abrupt restrictive diverter 250 is in direct compressed opposition to static sealing surface 240 and thereby maintains the intended abrupt rise in interfacial contact pressure conducive to providing a restrictive action which restricts the leakage of lubricant at the trailing edge and therefore enhances film thickness by the restriction and diversion actions previously enumerated in conjunction with the preferred embodiment. The groove has a maximum width 295a and a minimum width 295b which are timed with the maximum width 228a and minimum width 228B of dynamic sealing surface 226. The inventor and his associates have tested grooved versions of hydrodynamic rotary shaft seals embodying the present invention, using water as the lubricant, and have documented leakage rates of over 100 cc per inch of circumference per hour, which is significantly greater than the flushing action provided by prior art grooved hydrodynamic seals manufactured per the teachings of U.S. Pat. No. 5,678,829, commonly assigned herewith.

DESCRIPTION OF BI-DIRECTIONAL EMBODIMENT IN CONJUNCTION WITH FIGS. 13–13D

Figure 13B:
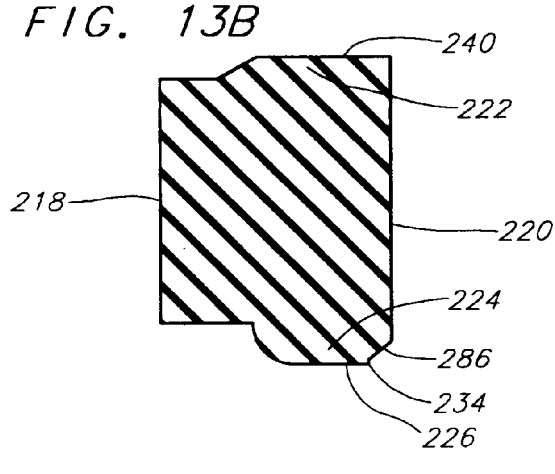
FIG. 13B is a cross-sectional illustration taken along line 13B—13B of FIG. 13.
Figure 13A:
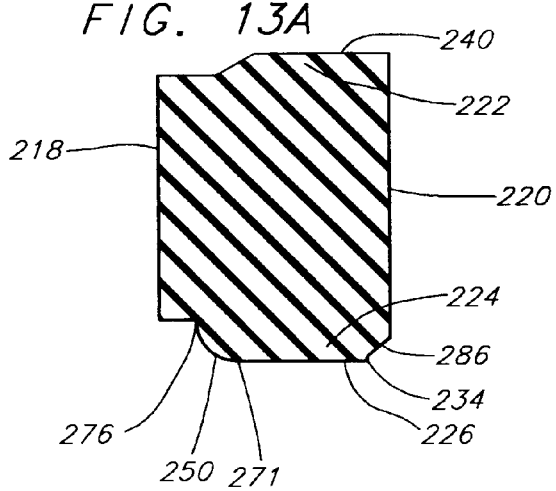
FIG. 13A is a cross-sectional illustration taken along line 13A—13A of FIG. 13.
Figure 13C:
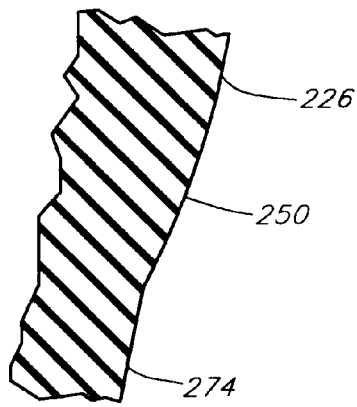
FIG. 13C is a fragmentary cross-sectional illustration taken along line 13C—13C of FIG. 13.
Figure 13D:
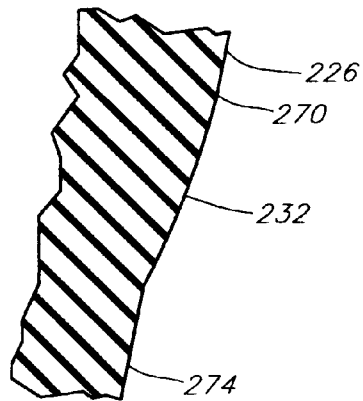
FIG. 13D is a fragmentary cross-sectional illustration taken along line 13D—13D of FIG. 12.
Figure 13:
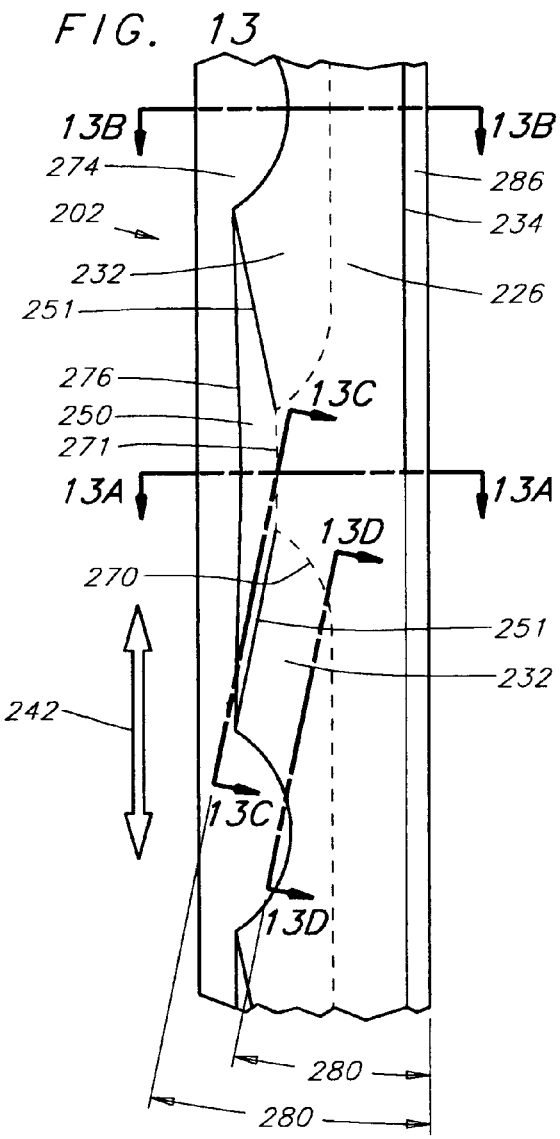
FIG. 13 is a fragmentary view showing the hydrodynamic seal of an alternate embodiment and showing the geometry of the seal in relation to bi-directional rotation of the relatively rotatable surface.

Although the embodiments described above all relate to seals of substantially unidirectional configuration, the invention also admits to bi-directional configurations, as shown by FIGS. 13–13D, which show an embodiment patterned on the basic geometry of FIG. 10 but in back to back deployment. Several features in FIGS. 13–13D are numbered for the purpose of orienting the reader, as follows: static sealing lip 222, static sealing surface 240, circular dynamic sealing lip 224, dynamic sealing surface 226, circular exclusionary geometry 234, relative rotation direction 242, abrupt restrictive diverter 250, leading edge restrictive diverter 251, hydrodynamic inlet 232, tangency location 270, tangency location 271, rebated surface 274, intersection location 276, flexible transitional geometry 286, surface 218 which would be oriented toward the lubricant, and surface 220 which would be oriented toward the environment.

In the bi-directional embodiment shown in FIGS. 13–13D, the primary diversion action is provided by leading edge restrictive diverter 251, which is created by the external corner formed by the intersection of hydrodynamic inlet 232 and abrupt restrictive diverter 250. When the seal is installed, a portion of leading edge restrictive diverter 251 is located within the dynamic sealing interface, and functions to restrict and divert the lubricant and thereby enhance interfacial film thickness. Leading edge restrictive diverter 251 is skewed relative to relative rotation direction 242 by radius skew angle 280. The abrupt restrictive diverter 250 has little or no skew, but still restricts side leakage from the dynamic sealing interface back into the lubricant, and thus enhances film thickness.

The large radius of the hydrodynamic inlet 232 oriented at radius skew angle 280 produces a stronger wedging action compared to the prior art by virtue of the more gradual convergence between the seal and the relatively rotatable surface which is provided by the large radius being nearly aligned with relative rotation direction 242.

In view of the foregoing it is evident that the present invention is one well adapted to attain all of the objects and features hereinabove set forth, together with other objects and features which are inherent in the apparatus disclosed herein.

As will be readily apparent to those skilled in the art, the present invention may easily be produced in other specific forms without departing from its spirit or essential characteristics. The present embodiment is, therefore, to be considered as merely illustrative and not restrictive, the scope of the invention being indicated by the claims rather than the foregoing description, and all changes which come within the meaning and range of equivalence of the claims are therefore intended to be embraced therein.

I claim:

1. A circular interference type hydrodynamic seal for location within a circular seal groove for dynamic sealing engagement within a relatively rotatable surface and serving as a partition between a lubricant supply and an environment and for controlling interfacial contact pressure between said hydrodynamic seal and the relatively rotatable surface and thus enhancing lubricant film thickness between said hydrodynamic seal and the relatively rotatable surface, comprising:
   (a) a circular ring-like seal body being composed of resilient material defining a lubricant surface for exposure to the lubricant supply and an environment surface for exposure to the environment;
   (b) a circular dynamic sealing lip being defined by said seal body and projecting therefrom, said circular dynamic sealing lip having a circular dynamic sealing surface for establishing a dynamic sealing interface with the relatively rotatable surface and defining a non-circular hydrodynamic geometry for exposure to the lubricant supply and for hydrodynamically wedging a film of lubricant into said dynamic sealing interface and defining an abrupt circular exclusionary geometry for exposure to the environment and having a circular edge;
   (c) A substantially circular non-lubricated static sealing surface being defined by said seal body for static sealing engagement within the circular seal groove; and
   (d) at least one restrictive diverter of discontinuous geometry being defined by said circular dynamic sealing lip and acting on hydrodynamically wedged film of lubricant within said dynamic sealing interface to controllably move the hydrodynamically wedged film of lubricant within the dynamic sealing interface and inhibit movement of the hydrodynamically wedged film of lubricant of the dynamic sealing interface toward said lubricant supply.

2. The circular interference type hydrodynamic seal of claim 1, wherein:
   said restrictive diverter being of abrupt configuration and being oriented relative to said circular exclusionary geometry to divert lubricant toward said circular exclusionary geometry.

3. The circular interference type hydrodynamic seal of claim 1, wherein:
   said restrictive diverter being of abrupt configuration and being oriented in skewed relation with said circular exclusionary geometry to divert lubricant toward said circular exclusionary geometry.

4. The circular interference type hydrodynamic seal of claim 1, wherein:
   said restrictive diverter being at least one projection of abrupt configuration.

5. The circular interference type hydrodynamic seal of claim 1, wherein:
   said restrictive diverter being at least one projection of abrupt configuration and being oriented relative to said circular exclusionary geometry to divert lubricant toward said circular exclusionary geometry.

6. The circular interference type hydrodynamic seal of claim 1, wherein:
   said restrictive diverter being at least one projection of abrupt angular configuration and being oriented in angular relation to said circular edge of said abrupt circular exclusionary geometry to divert lubricant within said dynamic sealing interface toward said circular exclusionary geometry.

7. The circular interference type hydrodynamic seal of claim 1, wherein:
   (a) said non-circular hydrodynamic geometry being in the form of at least one wave having a leading edge defining a hydrodynamic inlet; and
   (b) said restrictive diverter being a plurality of spaced projections of abrupt configuration located on said at least one wave and being oriented in angular relation to said circular edge of said abrupt circular exclusionary geometry to divert lubricant within said dynamic sealing interface toward said circular exclusionary geometry.

8. The circular interference type hydrodynamic seal of claim 1, wherein:
   said restrictive diverter being at least one projection of abrupt and rounded configuration and being exposed to hydrodynamically wedged film of lubricant within said dynamic sealing interface and being oriented in angular relation to said circular edge of said abrupt circular exclusionary geometry to divert lubricant within said dynamic sealing interface toward said circular exclusionary geometry.

9. The circular interference type hydrodynamic seal of claim 1, wherein:
   (a) said non-circular hydrodynamic geometry being in the form of a wave having a leading edge defining a hydrodynamic inlet; and
   (b) said restrictive diverter being at least one projection of abrupt configuration and being oriented at an angle of skew in relation to said circular edge of said abrupt circular exclusionary geometry to divert lubricant within said dynamic sealing interface toward said circular exclusionary geometry.

10. The circular interference type hydrodynamic seal of claim 3, wherein:
    said skewed relation of said restrictive diverter being orientation of said restrictive diverter at an angle in the range of from about 7° to about 11° in relation to said circular exclusionary geometry.

11. The circular interference type hydrodynamic seal of claim 1, wherein:
    (a) said non-circular hydrodynamic geometry being in the form of at least one wave having a leading edge defining a hydrodynamic inlet; and
    (b) said restrictive diverter being a multiplicity of angularly oriented ridges and grooves defining a surface finish having a parallel grain pattern being skewed relative to a rotational direction aligned with the circular exclusionary geometry for diverting lubricant within said dynamic sealing interface toward said circular exclusionary geometry.

12. The circular interference type hydrodynamic seal of claim 1, wherein:
    (a) said non-circular hydrodynamic geometry being in the form of at least one wave having a leading edge defining a hydrodynamic inlet and having a trailing edge; and
    (b) said restrictive diverter being defined by said trailing edge of said at least one wave.

13. The circular interference type hydrodynamic seal of claim 12, wherein:

said trailing edge of said at least one wave being an external corner.

14. The circular interference type hydrodynamic seal of claim 12, wherein:
   restrictive diverter being in the form of a substantially elliptical shape.

15. The circular interference type hydrodynamic seal of claim 12, wherein:
   (a) said abrupt restrictive diverter having a diverter radius of curvature and said hydrodynamic inlet having an inlet radius of curvature; and
   (b) said diverter radius of curvature of said restrictive diverter defined by said trailing edge of said at least one wave being smaller than said inlet radius of curvature of said hydrodynamic inlet at the leading edge of said at least one wave for creating increased interfacial contact pressure at said trailing edge and for enhancing lubricant film thickness between said hydrodynamic seal and the relatively rotatable surface.

16. The circular interference type hydrodynamic seal of claim 1, wherein:
   (a) said non circular hydrodynamic geometry and said restrictive diverter providing a net leakage of said film of lubricant from said sealing interface into said environment, said net leakage providing a flushing action which flushes environmental contaminants from said sealing interface; and
   (b) said circular ring-like seal body defining a substantially circular groove for facing said environment, said substantially circular groove being defined in part by spaced circular body rims being flexible toward said substantially circular groove for controlling interfacial contact pressure of said circular dynamic sealing lip with the relatively rotatable surface thereby regulating said film of lubricant and regulating said flushing action.

17. The circular interference type hydrodynamic seal of claim 16, wherein:
   (a) said circular dynamic sealing surface having a maximum width and a minimum width; and
   (b) said substantially circular groove having a maximum width and a minimum width timed with said maximum width and minimum width of said circular dynamic sealing surface.

18. The circular interference type hydrodynamic seal of claim 1, wherein:
   (a) said circular dynamic sealing lip establishing an interfacial contact pressure with the relatively rotatable surface at said dynamic sealing interface; and
   (b) said circular dynamic sealing lip defining a flexible transitional geometry being exposed to said environment and intersecting said circular dynamic sealing lip at said circular exclusionary geometry, said flexible transitional geometry moderating and controlling the leakage rate by amplifying said interfacial contact pressure adjacent to said circular exclusionary geometry.

19. The circular interference type hydrodynamic seal of claim 1, wherein:
   a circular static non-lubricated sealing lip being defined by said circular ring-like seal body and being disposed in opposed relation with said circular dynamic sealing lip.

20. The circular interference type hydrodynamic seal of claim 1, wherein:
   (a) said relatively rotatable surface having a direction of relative rotation being substantially aligned with said circular exclusionary geometry, and
   (b) said non-circular hydrodynamic geometry defining a hydrodynamic inlet having a radius oriented within 18° of alignment with respect to the direction of relative rotation of said relatively rotatable surface.

21. The circular interference type hydrodynamic seal of claim 1, wherein:
   said non-circular hydrodynamic geometry defining a hydrodynamic inlet having a radius greater than 1/8 inch.

22. The circular interference type hydrodynamic seal of claim 21, wherein:
   said hydrodynamic inlet being a radius of from about 0.49 inch to about 1.95 inch.

23. The circular interference type hydrodynamic seal of claim 1, wherein:
   said circular ring-like seal body being defined by a first seal body section having a defined modulus of elasticity and a second seal body section having a modulus of elasticity greater than said defined modulus of elasticity, said first and second seal body sections being integrally connected and with said second seal body section defining said dynamic sealing lip, said modulus of elasticity of said second seal body section enhancing extrusion resistance of said hydrodynamic seal, controlling hydrodynamic wedging of lubricant into said sealing interface, controlling interfacial contact pressure of said circular dynamic sealing lip with said relatively rotatable surface and minimizing compression induced distortion of said non-circular hydrodynamic geometry.

24. The circular interference type hydrodynamic seal of claim 1, wherein:
   said circular ring-like seal body having an axial end defining said dynamic sealing lip, said circular exclusionary geometry being located at the circular inner periphery of said dynamic sealing surface.

25. The circular interference type hydrodynamic seal of claim 1, wherein:
   said circular ring-like seal body having an axial end defining said dynamic sealing lip, said circular exclusionary geometry being located at the outer periphery of said dynamic sealing surface.

26. The circular interference type hydrodynamic seal of claim 1, wherein:
   said dynamic sealing surface of said dynamic sealing lip being located at the internal diameter of said circular ring-like seal body.

27. The circular interference type hydrodynamic seal of claim 1, wherein:
   (a) said relatively rotatable surface having a direction of relative rotation, and
   (b) said restrictive diverter establishing a zone of interfacial contact pressure being skewed relative to said direction of relative rotation.

28. A circular interference type hydrodynamic seal for location within a circular seal groove for dynamic sealing engagement within a relatively rotatable surface and serving as a partition between a lubricant supply and an environment and for controlling interfacial contact pressure between said hydrodynamic seal and the relatively rotatable surface and thus enhancing lubricant film thickness between said hydrodynamic seal and the relatively rotatable surface, comprising:
   (a) a circular ring-like seal body being composed of resilient material defining a lubricant surface for exposure to the lubricant supply and an environment surface for exposure to the environment;
   (b) a circular dynamic sealing lip being defined by said seal body and projecting therefrom, said circular dynamic sealing lip having a circular dynamic sealing surface for establishing a dynamic sealing interface with said relatively rotatable surface and defining a non-circular hydrodynamic geometry for exposure to the lubricant supply and for hydrodynamically wedging a film of lubricant into said dynamic sealing interface and defining an abrupt circular exclusionary geometry for exposure to the environment and having a circular edge;

(c) a circular non-lubricated static sealing surface being defined by said seal body for static sealing engagement within the circular seal groove; and (d) at least one restrictive diverter of abrupt and discontinuous configuration being defined by said circular dynamic sealing lip and being exposed to lubricant within said dynamic sealing interface and being oriented in skewed relation with said circular exclusionary geometry for limiting leakage of hydrodynamically wedged lubricant from said dynamic sealing interface toward said lubricant supply and for diverting a portion of the hydrodynamically wedged lubricant toward said circular exclusionary geometry to enhance lubricant film thickness and distribution within said sealing interface.

29. A circular interference type hydrodynamic seal for location within a circular seal groove for dynamic sealing engagement within a relatively rotatable surface and serving as a partition between a lubricant supply and an environment and for controlling interfacial contact pressure between said hydrodynamic seal and the relatively rotatable surface and thus enhancing lubricant film thickness between said hydrodynamic seal and the relatively rotatable surface, comprising:

(a) a circular ring-like seal body being composed of resilient material defining a lubricant surface for exposure to the lubricant supply and an environment surface for exposure to the environment;

(b) a circular dynamic sealing lip being defined by said seal body and projecting therefrom, said circular dynamic sealing lip having a circular dynamic sealing surface for establishing a dynamic sealing interface with the relatively rotatable surface and defining a non-circular hydrodynamic geometry for exposure to the lubricant supply and for hydrodynamically wedging a film of lubricant into said dynamic sealing interface for exposure to the environment and having a circular edge;

(c) a circular non-lubricated static sealing surface being defined by said seal body for static sealing engagement within the circular seal groove; and (d) at least one restrictive diverter of discontinuous geometry defined by said circular dynamic sealing lip and being exposed to a hydrodynamically wedged film of lubricant within said dynamic sealing interface and being oriented in skewed relation with said circular exclusionary geometry for limiting leakage of the hydrodynamically wedged film of lubricant from said dynamic sealing interface toward said lubricant supply and for diverting a portion of the hydrodynamically wedged film of lubricant of said dynamic sealing interface toward said circular exclusionary geometry to enhance lubricant film thickness and distribution within said dynamic sealing interface.

30. The circular interference type hydrodynamic seal of claim 29, wherein:
said restrictive diverter means being a ledge.

31. The circular interference type hydrodynamic seal of claim 29, wherein:
(a) said non-circular hydrodynamic geometry being in the form of a wave having a leading edge defining a hydrodynamic inlet and having a trailing edge; and
(b) said at least one restrictive diverter being defined by said trailing edge of said wave.

32. The circular interference type hydrodynamic seal of claim 29, wherein:
said circular dynamic sealing lip defining a flexible transitional geometry being exposed to said environment and intersecting said dynamic sealing lip at said circular exclusionary geometry, said flexible transitional geometry moderating and controlling leakage of hydrodynamically wedged lubricant from said dynamic sealing interface.

33. A circular interference type hydrodynamic seal for location within a circular seal groove for dynamic sealing engagement within a relatively rotatable surface and serving as a partition between a lubricant supply and an environment and for controlling interfacial contact pressure between said hydrodynamic seal and the relatively rotatable surface and thus enhancing lubricant film thickness between said hydrodynamic seal and the relatively rotatable surface, comprising:

(a) a circular ring-like seal body being composed of resilient material defining a lubricant surface for exposure to the lubricant supply and an environment surface for exposure to the environment;

(b) a circular dynamic sealing lip being defined by said seal body and projecting therefrom, said circular dynamic sealing lip having a circular dynamic sealing surface for sealing engagement with said relatively rotatable surface to establish a dynamic sealing interface between said dynamic sealing lip and said relatively rotatable surface and defining a non-circular hydrodynamic geometry for exposure to the lubricant and for hydrodynamically wedging a film of lubricant into said dynamic sealing interface and defining an abrupt circular exclusionary geometry for exposure to the environment and having a circular edge;

(c) a circular non-lubricated static sealing surface being defined by said seal body for static sealing engagement within the circular seal groove; and (d) said non-circular hydrodynamic geometry being in the form of at least one wave having a leading edge defining a hydrodynamic inlet radius greater than ⅛ inch.

34. The circular interference type hydrodynamic seal of claim 33, wherein:
said hydrodynamic inlet radius being oriented within 18° of alignment with respect to said circular exclusionary geometry.

35. The circular interference type hydrodynamic seal of claim 33, wherein:
said at least one wave being a plurality of waves each having a circumferential length of from about 0.45 inches to about 0.65 inches.

36. The circular interference type hydrodynamic seal of claim 33, wherein:
(a) the projection of said dynamic sealing lip from said seal body establishing a rebated surface, and
(b) said hydrodynamic inlet radius establishing intersection with said rebated surface.

* * * * *